United States Patent [19]

Etsion

[11] 4,260,166
[45] Apr. 7, 1981

[54] SELF-STABILIZING RADIAL FACE SEAL

[76] Inventor: Robert A. Frosch, Administrator of the National Aeronautics and Space Administration, with respect to an invention of Izhak Etsion, Haifa, Israel

[21] Appl. No.: 961,832

[22] Filed: Nov. 17, 1978

[51] Int. Cl.³ .............................................. F16J 15/34
[52] U.S. Cl. .................................................... 277/96
[58] Field of Search ........................ 237/96, 96.1, 96.2, 237/81 R

[56] References Cited

U.S. PATENT DOCUMENTS

| | | | |
|---|---|---|---|
| 2,554,488 | 5/1951 | Carr | 277/96.2 |
| 2,984,506 | 5/1961 | Andresen | 277/96.2 |
| 3,588,128 | 6/1971 | Peterson | 277/96.2 |
| 4,026,564 | 5/1977 | Metcalfe | 277/96.1 |

*Primary Examiner*—Robert I. Smith
*Attorney, Agent, or Firm*—N. T. Musial; J. R. Manning; G. E. Shook

[57] ABSTRACT

A self-stabilizing radial face seal comprising an axial member, a primary seal ring juxtapositioned to a seal seat, at least one of said primary seal ring and seal seat being affixed to said axial member so as to rotate therewith, said primary seal ring having a front face which opposes a face of said seal seat, said seal having both high-pressure and low-pressure regions of fluid, said seal seat being provided with a porous ring-like circumferential structure in the face of said seal seat opposite said front face of said primary seal ring.

7 Claims, 4 Drawing Figures

SELF-STABILIZING RADIAL FACE SEAL

GOVERNMENT RIGHTS

The invention described herein was made in the performance of work under a NASA contract and is subject to the provisions of Section 305 of the National Aeronautics and Space Act of 1958, Public Law 85-568 (72 Statute 435; 42 U.S.C. 2457).

BACKGROUND OF THE INVENTION

This invention relates to an improved radial face seal and, more specifically, to a self-stabilizing radial face seal.

Face-type fluid seals are shaft seals generally comprising a nonrotating or stationary seal face and a rotor ring provided to rotate with the shaft and having a face opposing that of the stator seal, the opposing faces extending radially outwardly from the periphery of the shaft, thereby effecting a seal between the low-pressure and high-pressure regions of a surrounding and engulfing fluid. Radial face seals operate with extremely small gaps between the stationary or primary seal ring and the opposing face of the rotor ring or seal seat. It is necessary that the tolerances for the existing space or gap be closely monitored so that the existing gap is held as closely as possible to its design value so as to avoid excessive fluid leakage or high friction loss. To realize this, the primary seal ring must be placed in a stabilized condition both under hydrostatic as well as hydrodynamic conditions. That is, proper equilibrium must be reached between high-pressure and low-pressure regions both under conditions when the liquids involved are at rest and to the pressures they exert or transmit as well as under conditions when motion of the fluids exert a force which acts on the elements of the seal immersed in the fluids.

Conventional radial face seals consisting of a primary seal ring or stator member and a rotor seal ring are inherently unstable, generally due to an angular misalignment brought about by hydrodynamic effects establishing a pressure differential which produces a transverse moment which alters and disturbs the seal of the primary or stator seal ring. This pressure distribution produces the dynamic instability having a detrimental effect upon the resulting seal.

It has been found that means must be provided within a face-type fluid seal so as to eliminate the instability created with respect to the seal as a result of the hydrodynamic effects within the system. One approach in the design of the face-type fluid seals to control the seal performance and to accommodate the axial movement has been to isolate both the rotor and the stator from the pump housing. A discussion of such a design for hydrostatic seals may be found in ASME Publication 68-WA/LUB-9, "The Spring-Supported Hydrostatic Seal", by I. J. Billington and T. E. Fitzsimmons. However, it is not desirable to be relegated to a system whereby it is necessary to isolate the rotor and stator from the pump housing.

It has further been found that it is important that the stator ring of the face-type fluid seal be well supported relative to the housing and adapted so as to resist annular overturning moments which may act on the stator ring. To achieve this purpose, a stator ring has been proposed having a support annulus formed on the back face thereof through which there may be a force transmitted which tends to oppose any overturning moment which develops on the ring. Although achieving certain desired results, this approach is not without its disadvantages. For example, the annulus is fixed or becomes a part of the stator ring and subject to imperfections as well as wear which reduces the dependability of the proposed system. Furthermore, slots must be cut in the support annulus so as to provide for pressure communication of the fluid in the system. The purpose of the support annulus is to provide an additional force acting against the back face of the stator seal so that the additional force tends to overcome the overturning moments created by the hydrodynamic system. However, with the use of an annulus of the nature herein described, the incumbent system becomes inflexible in that the position of the support annulus is quite critical and not adaptable to a change in the force vectors necessary to oppose the overturning moment produced within the system. Thus, the manufacturing tolerances of such a member are such that the support annulus cannot always be machined to assure that it will contact the support face throughout its entire length. Thus, the material requirements in fabricating the support annulus become critical.

SUMMARY OF THE INVENTION

It is, therefore, an object of the present invention to provide a system which will overcome the above-noted disadvantages.

It is still another object of the present invention to provide a system which will reduce the transverse moment produced by the present hydrodynamic effects in the system by attenuating the circumferential pressure distribution in the primary or stator seal.

Still another object of the present invention is to provide a system whereby both axial and angular stiffness can be produced in the resulting seal.

Yet still another object of the present invention is to produce a self-stabilizing radial face seal.

Yet still a further object of the present invention is to provide a face-type fluid seal adapted so as to assure proper alignment of the primary seal ring as the seal is brought into operating conditions.

Yet still another object of the present invention is to provide a uniform circumferential force distribution so as to eliminate seal misalignment.

Other objects and further scope of applicability of the present invention will become apparent from the detailed description given hereinafter. It should be understood, however, that the detailed description along with the discussion of the accompanying drawings indicating preferred embodiments of the present invention, are given by way of illustration only since various changes and modifications within the spirit and scope of the instant invention would become apparent to those skilled in the art as a result of this detailed description. Any such modifications and changes should be considered to be encompassed within the scope of this invention.

GENERAL DESCRIPTION OF THE INVENTION

The above-stated objects and others are accomplished in accordance with the present invention, generally speaking by providing a radial face seal comprising a primary seal ring and a seal seat mounted on a shaft which extends through a housing. Generally speaking, the seal is adapted to seal a high-pressure region within the housing from a low-pressure region and permits controlled communication of fluid within the system. The primary seal ring is protected against rotation with the shaft generally by means of a pin or key member. The seal seat is generally provided so as to rotate freely with the shaft within the housing member. The seal seat is provided with a porous, ring-like structure inserted in the face of the seal seat such that it faces the engaging surface of the primary seal or is situated opposite the face of said surface, separated therefrom by the narrow gap which may exist between the primary seal ring and the seal seat. The presence of the porous ring allows for a circumferential flow of fluid within the porous material, thereby establishing the desired equilibrium necessary to stabilize the primary seal ring. In addition, in order to introduce both axial and angular stiffness to the resulting seal, a circumferential cavity may be introduced behind or in back of the porous ring which is connected to the seal high-pressure regions, which can be positioned either inside or outside the seal.

It has been determined in the course of the present invention that upon the introduction of a porous ring into the seal seat of the rotor member of a radial face seal at a position facing the face of the primary seal ring that the primary seal ring may be stabilized both statically and dynamically. By attenuating the circumferential pressure distribution in the primary seal, the transverse moment about the primary seal due to hydrodynamic effects is reduced, thereby substantially eliminating the resulting misalignment effects of the transfer moment tending to be produced. The presence of the porous ring allows for a circumferential flow of the fluid present within the porous material. Hence, the fluid from the high-pressure regions may be readily transferred into the low-pressure regions, thereby reducing the asymmetry of the circumferential pressure distribution within the system. It has further been determined that by introducing, in addition to the porous ring, a circumferential cavity in back of the porous ring, connected via passages to the seal high-pressure fluid areas, that the instant cavity serves as a constant pressure reservoir with the porous ring, allowing a self-controlled axial flow from the cavity into the seal gap. This arrangement provides both the axial and angular stiffness desired within the seal.

BRIEF DESCRIPTION OF THE DRAWINGS

The present invention will become more fully understood from the detailed description set forth in the accompanying drawings which are given by way of illustration only, and thus are not limitative of the present invention, and wherein.

DETAILED DESCRIPTION OF THE DRAWINGS

Figure 1:
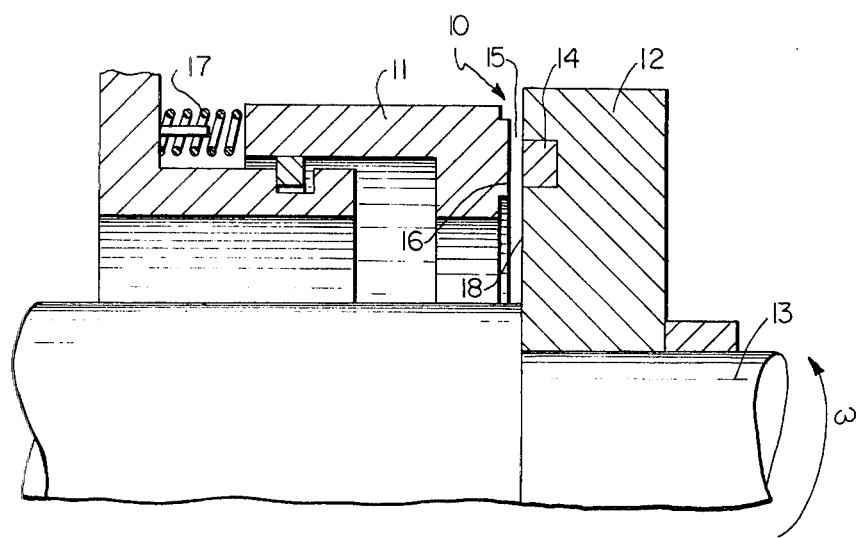
FIG. 1 represents a cross section of the self-stabilizing radial face seal of the present invention illustrating the circumferential porous ring.

As set forth in FIG. 1, there is seen a self-stabilizing radial face seal generally designated 10 comprising a primary seal ring or stator 11 and an opposing seal seat or rotor 12. The radial face seal 10 is mounted on a shaft 13. The rotor or seal seat member 12 secured to the shaft 13 for rotation therewith, as indicated by omega ($\omega$), has a porous ring 14 inserted in the face of the seal seat 12 such that it is facing the primary seal ring or stator member 11. A narrow gap 15 exists between the opposing faces of the primary seal 11 and the seal seat 12 which provides for a low tolerance continuity between the high-pressure and low-pressure fluid-retaining areas of the seal. It is important to maintain this gap as close as possible to its design value so as to avoid excessive leakage of fluid or high friction loss.

The stator or primary seal ring member 11 is generally secured against rotation by a key or pin-like structure (not shown), the stator having an annular-shaped seal face 16 opposite the face of the porous ring 14. Resilient means in the form of compression spring 17 compresses the annular-shaped seal face 16 of the primary seal ring 11 into sealing contact with the seal face 18 of the seal seat 12 and the face of the porous ring 14 so as to minimize the escape of pressurized fluid therebetween.

Figure 2:
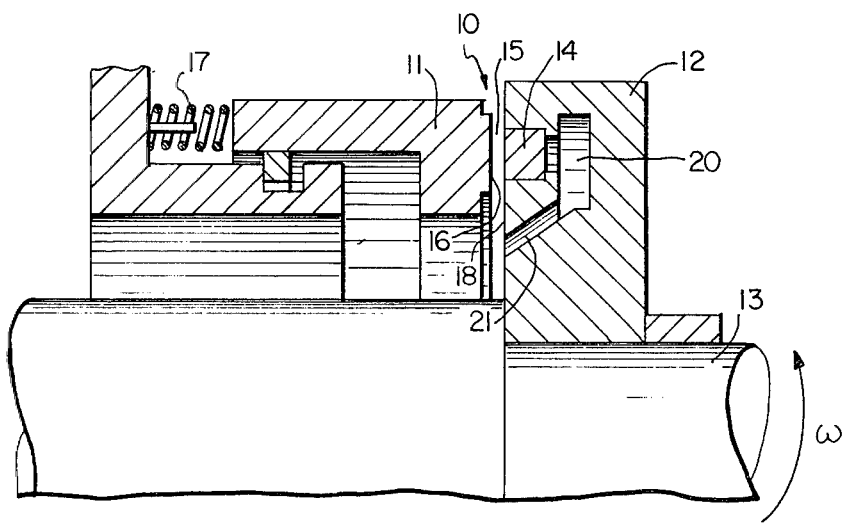
FIG. 2 represents a cross section of the radial face seal of FIG. 1, further including the circumferential cavity in proximity with the porous seal.

In FIG. 2, there is seen a self-stabilizing radial face seal generally of the nature described in FIG. 1. Provided in a position behind the circumferential porous ring 14 is a circumferential cavity 20 being connected to the seal high-pressure zone of the radial face seal by passageway 21. This cavity serves as a constant pressure reservoir with the porous ring 14 allowing for a self-controlled axial flow of fluid from the cavity into the seal gap 15. As stated above, this configuration provides both for axial and angular stiffness of the seal.

Figure 3:
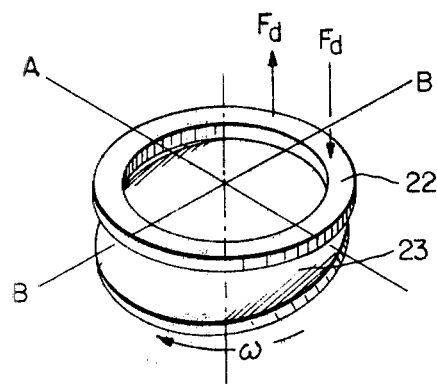
FIG. 3 represents a conventional, inherently unstable radial face seal ring.

FIG. 3 represents a configuration of a conventional radial face seal ring having a primary seal ring 22 and a seal seat 23. The instability created within the system is initiated by an angular misalignment about any radial line such as is represented by the line A—A. Such misalignment generates through hydrodynamic effects a pressure distribution which produces forces, $F_d$. These forces produce a transverse moment about the line B—B producing a wobbling of the primary seal ring 22. An angle $\theta$ is a circumferential coordinate measured from the point of maximum clearance on the line B—B, in the direction of the rotational speed, omega ($\omega$).

Figure 4:
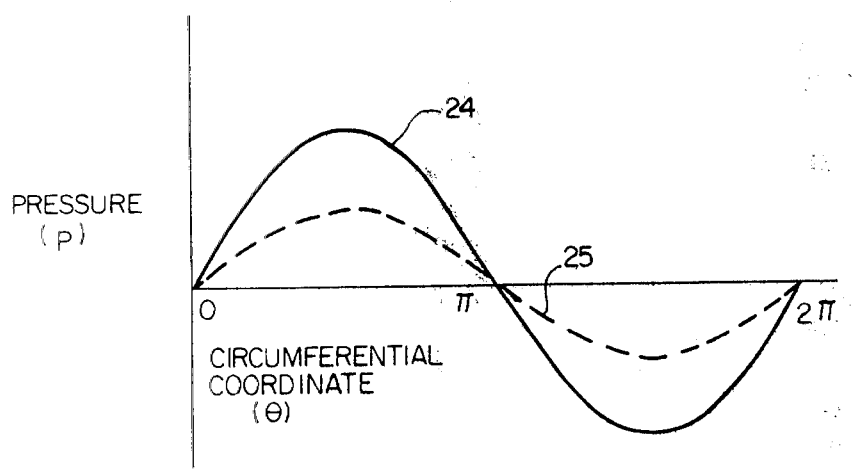
FIG. 4 is an expression of the circumferential pressure distribution in a misaligned radial face seal and one having a circumferential porous ring.

FIG. 4 represents a graph of the circumferential pressure distribution in a radial face seal. The effect realized as a result of the introduction of the circumferential porous ring into the conventional radial face seal system is represented. As seen therein, a typical pressure distribution in a conventional misaligned radial face seal is shown in FIG. 4 by the solid line identified as 24. This pressure distribution is the source of the dynamic instability in a conventional seal. As a result of introducing the porous ring into the face of the seal seat, the fluid from the high-pressure regions is transferred into the low-pressure regions, thereby reducing the asymmetry of the circumferential pressure distribution as shown by the dotted line 25.

The invention being thus described, it will be obvious that the same may be varied in many ways. Such variations are not to be regarded as a departure from the spirit and scope of the instant invention, and all such modificarions as would be obvious to one skilled in the art are intended to be encompassed within the scope of this invention as hereinafter claimed.

What is claimed is:

1. In a radial face seal between high-pressure and low-pressure regions of fluid along an axial member having a primary seal ring for sealably engaging a seal seat wherein at least one of said primary seal ring and seal seat is affixed to said axial member so as to rotate therewith and said primary seal ring has an annular front face spaced from a mating face of said seal seat by a narrow gap during rotation, the improvement comprising a porous, ring-like circumferential structure mounted in said seal seat and having a face opposite the annular front face of said primary seal ring substantially coplanar with the mating face of said seal seat whereby fluid is transferred through said porous structure from said high-pressure region into said low-pressure region during rotation thereby reducing the asymmetry of the circumferential pressure distribution so that the seal is stabilized under both hydrostatic and hydrodynamic conditions, and resilient biasing means for moving said primary seal ring into contact with said seal seat when said axial member is stationary whereby said annular front face simultaneously sealably engages said mating surface of said seat and said coplanar face of said porous structure thereby inhibiting said fluid transfer therethrough.

2. The radial face seal as disclosed in claim 1, further including a circumferential cavity positioned behind said porous ring.

3. The radial face seal as disclosed in claim 2, wherein said circumferential cavity is connected to the high-pressure zone of said seal such that there exists a continuous network for the flow of fluid to the backside of said porous ring.

4. The radial face seal as disclosed in claim 3, wherein said high-pressure zone is situated inside of said seal.

5. The radial face seal as disclosed in claim 3, wherein said high-pressure zone is positioned outside of said seal.

6. A radial face seal as claimed in claim 1 wherein the resilient biasing means comprises a spring.

7. A radial face seal as claimed in claim 1 wherein the annular front face of said primary seal ring sealably engages the mating surface of said seat along both the inner peripheral edge and the outer peripheral edge of the coplanar face of said porous structure.

* * * * *